US011868865B1

(12) United States Patent
Banks et al.

(10) Patent No.: US 11,868,865 B1
(45) Date of Patent: Jan. 9, 2024

(54) SYSTEMS AND METHODS FOR CASH STRUCTURING ACTIVITY MONITORING

(71) Applicant: Fifth Third Bank, Cincinnati, OH (US)

(72) Inventors: Nathan Banks, Cincinnati, OH (US); David Black, Cincinnati, OH (US)

(73) Assignee: Fifth Third Bank, Cincinnati, OH (US)

( * ) Notice: Subject to any disclaimer, the term of this patent is extended or adjusted under 35 U.S.C. 154(b) by 0 days.

(21) Appl. No.: 18/331,222

(22) Filed: Jun. 8, 2023

Related U.S. Application Data

(60) Provisional application No. 63/424,284, filed on Nov. 10, 2022.

(51) Int. Cl.
*G06N 3/045* (2023.01)
*G06Q 30/018* (2023.01)
*G06N 3/0464* (2023.01)
*G06N 3/09* (2023.01)
*G06Q 40/02* (2023.01)

(52) U.S. Cl.
CPC .......... *G06N 3/045* (2023.01); *G06N 3/0464* (2023.01); *G06N 3/09* (2023.01); *G06Q 30/0185* (2013.01); *G06Q 40/02* (2013.01)

(58) Field of Classification Search
CPC ........ G06N 3/045; G06N 3/0464; G06N 3/09; G06N 20/00; G06N 3/08; G06N 20/20; G06N 5/01; G06N 3/04; G06N 3/044; G06N 3/088; G06N 7/01; G06N 3/02; G06N 5/04; G06N 3/047; G06Q 30/0185; G06Q 40/02; G06Q 20/4016; G06Q 20/407; G06Q 20/4014; G06Q 20/405; G06Q 30/06; G06F 18/214; G06F 18/22; G06F 2221/034; G06F 18/217; G06F 18/23213; G06V 10/82; G06V 20/52
See application file for complete search history.

(56) References Cited

U.S. PATENT DOCUMENTS

| | | | |
|---|---|---|---|
| 10,181,032 B1 * | 1/2019 | Sadaghiani | G06N 3/08 |
| 10,341,374 B1 * | 7/2019 | Sadaghiani | G06F 18/217 |
| 10,572,885 B1 * | 2/2020 | Guo | G06Q 40/03 |
| 10,796,380 B1 * | 10/2020 | Mossoba | G06Q 40/02 |
| 11,017,203 B1 * | 5/2021 | Aggarwal | G06V 40/1365 |

(Continued)

OTHER PUBLICATIONS

"Deep Learning and Explainable Artificial Intelligence Techniques Applied for Detecting Money Laundering—A Critical Review"; Dattatray Vishnu Kute, IEEE Access (vol. 9, pp. 82300-82317) (Year: 2021).*

(Continued)

*Primary Examiner* — Michael S Osinski
(74) *Attorney, Agent, or Firm* — BakerHostetler

(57) ABSTRACT

A system includes receiving data associated with an account, the data having a plurality of members; generating based on an ensemble teacher model, a deep learning model having a number of layers; inputting a plurality of members determined to be daily inputs into the deep learning model; extracting a daily pattern from the daily inputs and aggregating a deep learning model output; inputting the global inputs and an aggregated deep learning model output into a classifier; outputting from the classifier, a number of scores combined into a single score for the account. Further, the device may include alerting a user if the single score falls outside of a predetermined threshold.

27 Claims, 9 Drawing Sheets

(56) References Cited

U.S. PATENT DOCUMENTS

| | | | |
|---|---|---|---|
| 11,075,942 B2* | 7/2021 | Mei | H04L 63/0861 |
| 11,244,266 B2* | 2/2022 | Fukami | G06Q 10/06316 |
| 11,373,257 B1* | 6/2022 | Guo | G06N 20/00 |
| 11,399,045 B2* | 7/2022 | Latham | H04L 63/308 |
| 11,640,470 B1* | 5/2023 | Amar | G06N 20/20 |
| | | | 726/22 |
| 11,704,673 B1* | 7/2023 | Drapeau | G06Q 30/0185 |
| | | | 705/72 |
| 2017/0213280 A1* | 7/2017 | Kaznady | G06Q 40/03 |
| 2020/0394707 A1* | 12/2020 | Guo | G06Q 40/00 |
| 2021/0209613 A1* | 7/2021 | Tsung | G06N 20/20 |
| 2021/0272088 A1* | 9/2021 | Srivastava | G06F 16/55 |
| 2021/0312206 A1* | 10/2021 | Meidar | G06F 18/23213 |
| 2021/0312286 A1* | 10/2021 | Shaik | G06N 3/08 |
| 2021/0374756 A1* | 12/2021 | Pandey | G06N 3/08 |
| 2022/0092664 A1* | 3/2022 | Glaser | G06Q 30/0623 |
| 2022/0101327 A1* | 3/2022 | Arora | G06N 3/08 |
| 2022/0121961 A1* | 4/2022 | Chen | G06N 3/10 |
| 2022/0132179 A1* | 4/2022 | Bennett-James | G06V 20/70 |
| 2022/0156372 A1* | 5/2022 | Harang | G06F 21/56 |
| 2022/0180368 A1* | 6/2022 | Immaneni | G06Q 20/4014 |
| 2022/0277841 A1* | 9/2022 | Harmon | G16H 10/60 |
| 2022/0300976 A1* | 9/2022 | Bhatt | G06Q 20/4016 |
| 2022/0301031 A1* | 9/2022 | Iyer | G06Q 30/0623 |
| 2022/0343329 A1* | 10/2022 | Wang | G06N 20/00 |
| 2022/0358505 A1* | 11/2022 | Danielpour | G06N 5/04 |
| 2022/0374905 A1* | 11/2022 | Tabibian | G06Q 20/4014 |
| 2022/0391938 A1* | 12/2022 | Sridhar | G06N 20/00 |
| 2023/0034344 A1* | 2/2023 | Jain | G06F 40/216 |
| 2023/0039382 A1* | 2/2023 | Xu | G06F 21/554 |
| 2023/0059064 A1* | 2/2023 | Benkreira | G06Q 20/405 |
| 2023/0162278 A1* | 5/2023 | Martin | G06Q 40/06 |
| | | | 705/38 |

OTHER PUBLICATIONS

"Graph Neural Network for Fraud Detection via Spatial-Temporal Attention"; Dawei Cheng, IEEE Transactions on Knowledge and Data Engineering (vol. 34, Issue: 8, pp. 3800-3813) (Year: 2022).*

"Amaretto: An Active Learning Framework for Money Laundering Detection"; Danilo Labanca, IEEE Access (vol. 10, pp. 41720-41739) (Year: 2022).*

* cited by examiner

| Input | Description | Source |
|---|---|---|
| 1 | Non-Personal Account Indicator | 1 if *High Account Type="N"* |
| 2 | Savings Account Indicator | 1 if *Low Account Type* contains "SAVC" |
| 3 | Age of Account | Number of months between account open date and monitored month |
| 4 | Age of Customer Relationship | Number of months between customer since date and monitored month |
| 5 | Publicly Traded Indicator | From ECIF database |
| 6 | CTR Exempt Indicator | From ECIF database |
| 7 | MSB Indicator | From ECIF database |
| 8 | Non-Resident Indicator | From ECIF database |
| 9 | ATM Provider Indicator | Max of the two ATM service provider attributes from ECIF |
| 10 | Private Banking Client Indicator | From ECIF database |
| 11 | Count of Distinct Branch Locations used | Calculated from transaction narratives and short narratives |
| 12 | Count of Distinct ATM Locations used | Calculated from transaction narratives and short narratives |
| 13 | Count of Distinct Vault Locations used | Calculated from transaction narratives and short narratives |
| 14 | Count of Distinct Branches used for Cashed Checks | Calculated from transaction narratives and short narratives |
| 15 | Benford's Law with Hellinger Distance for first digit of all transactions[5] | Calculated from transactions |
| 16 | Cash Structuring Deposits Eligibility Indicator | 1 if sum of cash deposits ≤ $10k in monitored month is greater than $10,000 |
| 17 | Cash Structuring Withdrawals Eligibility Indicator | 1 if sum of cash deposits ≤ $10k in monitored month is greater than $10,000 |

FIG. 7

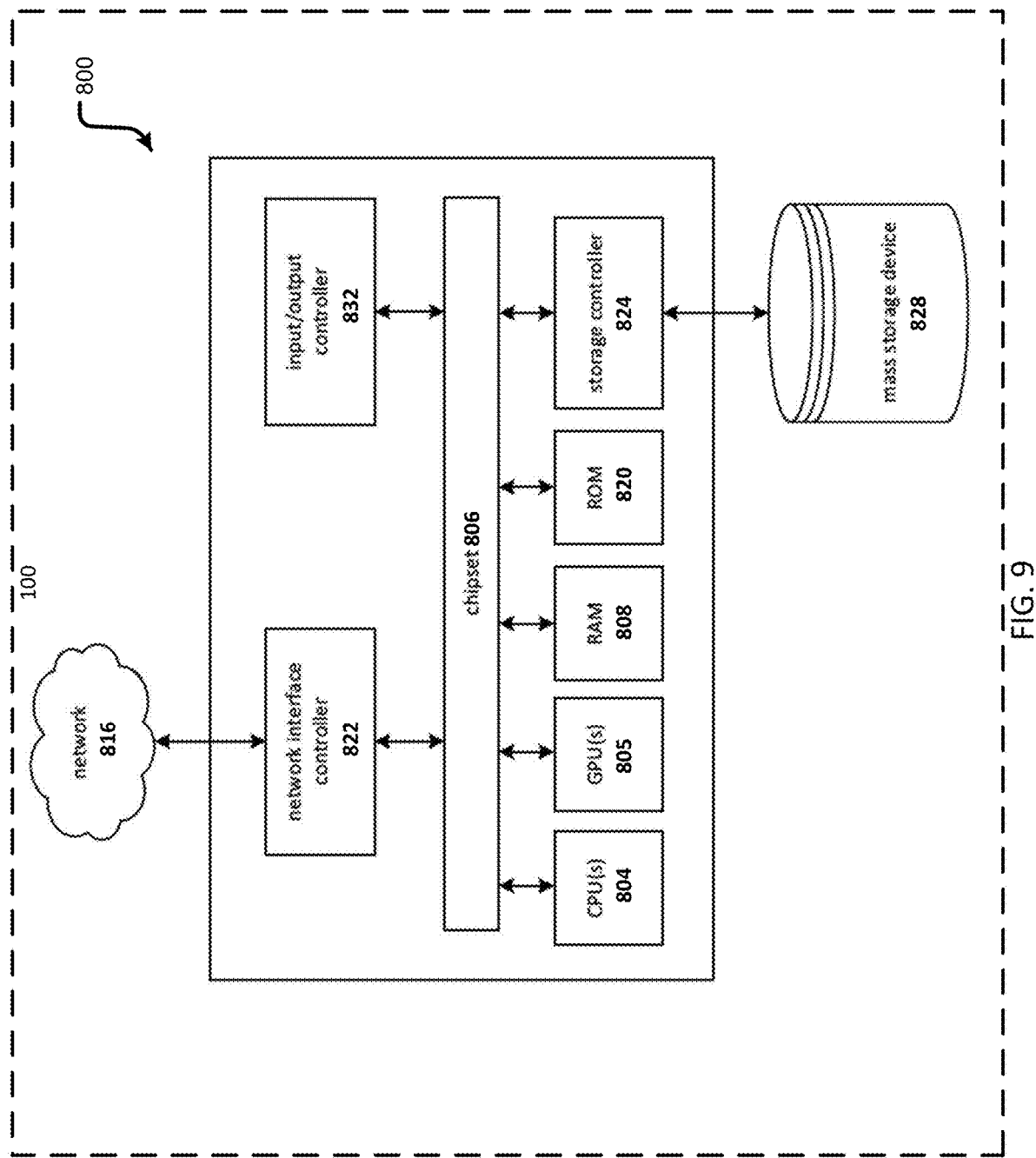

SYSTEMS AND METHODS FOR CASH STRUCTURING ACTIVITY MONITORING

CROSS-REFERENCE TO RELATED APPLICATIONS

This application claims the benefit from U.S. Provisional Application No. 63/424,284 filed on Nov. 10, 2022, which is hereby incorporated by reference in its entirety for all purposes as if fully set forth herein.

TECHNICAL FIELD

The disclosure relates generally to banking services and more specifically to monitoring cash structuring to identify money laundering or other financial crimes. More specifically, the disclosure relates to systems for cash structuring activity monitoring; and the disclosure relates to methods for cash structuring activity monitoring.

BACKGROUND

Banks and other financial institutions use financial crimes compliance detection programs to detect potential suspicious activity related to money laundering and other financial crimes, such as fraudulent activity. Cash structuring is the act of splitting up cash transactions over ten thousand dollars into multiple, smaller amounts to avoid filing a Currency Transaction Report (CTR). Cash structuring monitoring is meant to mitigate risk related to money laundering, terrorist financing, and other financial crimes associated with cash structuring activities. However, the typical financial crimes compliance detection programs fail to effectively and efficiently detect potential suspicious activity related to money laundering and other financial crimes.

Accordingly, systems and methods are needed to more effectively and efficiently identify potentially suspicious cash structuring activity that may be related to money laundering or other financial crimes.

SUMMARY

In one general aspect, a computer readable medium includes instructions for receiving data associated with an account, the data having a plurality of members. The computer readable medium in addition includes instructions for determining whether each of the plurality of members is a global input or a daily input. The computer readable medium moreover includes instructions for generating, based on an ensemble teacher model, a deep learning model having a number of layers, the number of layers alternating between a convolution layer and a non-linear activation function. The computer readable medium also includes instructions for inputting a plurality of members determined to be daily inputs into the deep learning model. The computer readable medium further includes instructions for extracting a daily pattern from the daily inputs and aggregating a deep learning model output; inputting the global inputs and an aggregated deep learning model output into a classifier; outputting, from the classifier, a number of scores combined into a single score for the account. The computer readable medium in addition includes instructions for alerting a user if the single score falls outside of a predetermined threshold.

In one general aspect, a method includes receiving, in at least one processor, data associated with an account, the data having a plurality of members. The method in addition includes determining with the at least one processor whether each of the plurality of members is a global input or a daily input. The method moreover includes generating with the at least one processor, based on an ensemble teacher model, a deep learning model having a number of layers, the number of layers alternating between a convolution layer and a non-linear activation function. The method also includes inputting with the at least one processor a plurality of members determined to be daily inputs into the deep learning model. The method further includes extracting with the at least one processor a daily pattern from the daily inputs and aggregating a deep learning model output; inputting with the at least one processor the global inputs and an aggregated deep learning model output into a classifier; outputting with the at least one processor, from the classifier, a number of scores combined into a single score for the account. The method in addition includes alerting with the at least one processor a user if the single score falls outside of a predetermined threshold.

In one general aspect, a system includes at least one processor configured to receive data associated with an account, the data having a plurality of members. The system in addition includes the at least one processor configured to determine whether each of the plurality of members is a global input or a daily input. The system moreover includes at least one processor configured to generate based on an ensemble teacher model, a deep learning model having a number of layers, the number of layers alternating between a convolution layer and a non-linear activation function. The system also includes at least one processor configured to input a plurality of members determined to be daily inputs into the deep learning model. The system further includes at least one processor configured to extract a daily pattern from the daily inputs and aggregating a deep learning model output; at least one processor configured to input the global inputs and an aggregated deep learning model output into a classifier; at least one processor configured to output a number of scores combined into a single score for the account. The system in addition includes at least one processor configured to alert a user if the single score falls outside of a predetermined threshold.

Certain embodiments of the disclosure may include none, some, or all of the above technical advantages. One or more other technical advantages may be readily apparent to one skilled in the art from the figures, descriptions and claims included herein.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 illustrates an exemplary table of the cash structuring monitoring process according to aspects of the disclosure.

FIG. 9 depicts a computing device that may be used in various aspects in implementing the cash structuring monitoring system.

DETAILED DESCRIPTION OF ILLUSTRATIVE EMBODIMENTS

Figure 1:
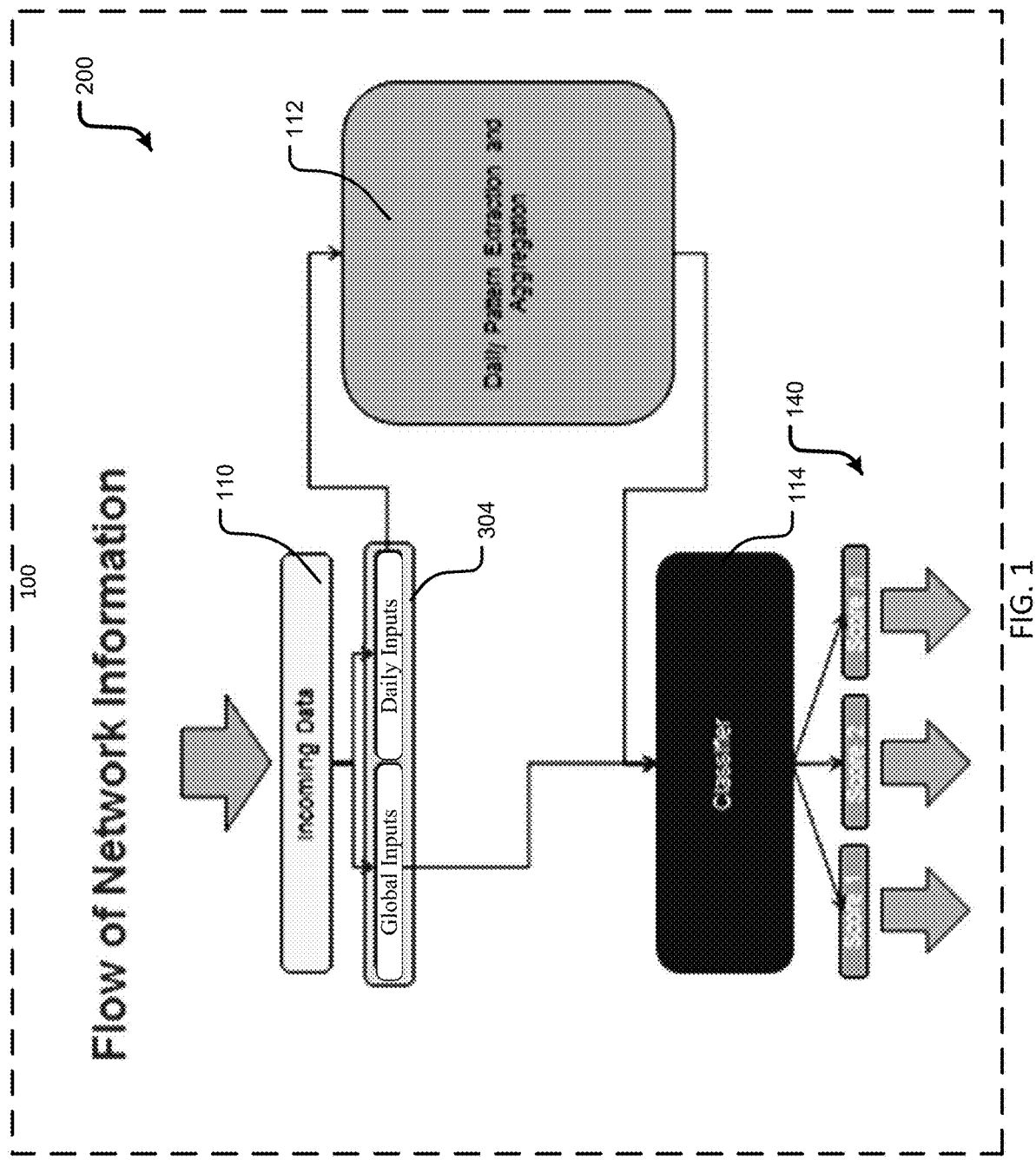
FIG. 1 illustrates partial details of a cash structuring monitoring process and a cash structuring monitoring system for cash structuring monitoring according to aspects of the disclosure.

Reference will now be made in detail to the exemplary embodiments of the disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only, and are provided to assist in the explanation of the apparatuses, devices, systems, and methods described herein. None of the features or components shown in the drawings or discussed below should be taken as mandatory for any specific implementation of any of these devices, systems or methods unless specifically designated as mandatory.

Also, for any methods described, regardless of whether the method is described in conjunction with a flow diagram, it should be understood that unless otherwise specified or required by context any explicit or implicit ordering of steps performed in the execution of a method does not imply that those steps must be performed in the order presented but instead may be performed in a different order or in parallel.

As used herein, the term "exemplary" is used in the sense of "example" rather than "ideal." Moreover, the terms "a" and "an" herein do not denote a limitation of quantity, but rather denote the presence of one or more of the referenced items.

FIG. 1 illustrates partial details of a cash structuring monitoring process and a cash structuring monitoring system for cash structuring monitoring according to aspects of the disclosure.

In particular, FIG. 1 illustrates partial details of a cash structuring monitoring system 100 and a cash structuring monitoring process 200 for cash structuring monitoring according to aspects of the disclosure. The disclosed implementations of the cash structuring monitoring system 100 and/or the cash structuring monitoring process 200 may be configured to identify potentially suspicious cash structuring activity that may be related to money laundering or other financial crimes. The disclosed implementations of the cash structuring monitoring system 100 and/or the cash structuring monitoring process 200 may be configured for various banking products including Deposit and Withdrawal checking (DDA) and savings (SAV) account cash activity. The disclosed implementations of the cash structuring monitoring system 100 and/or the cash structuring monitoring process 200 may be configured for classifying potentially suspicious cash structuring activity occurring in Personal and Non Personal DDA and SAV accounts.

Figure 6:
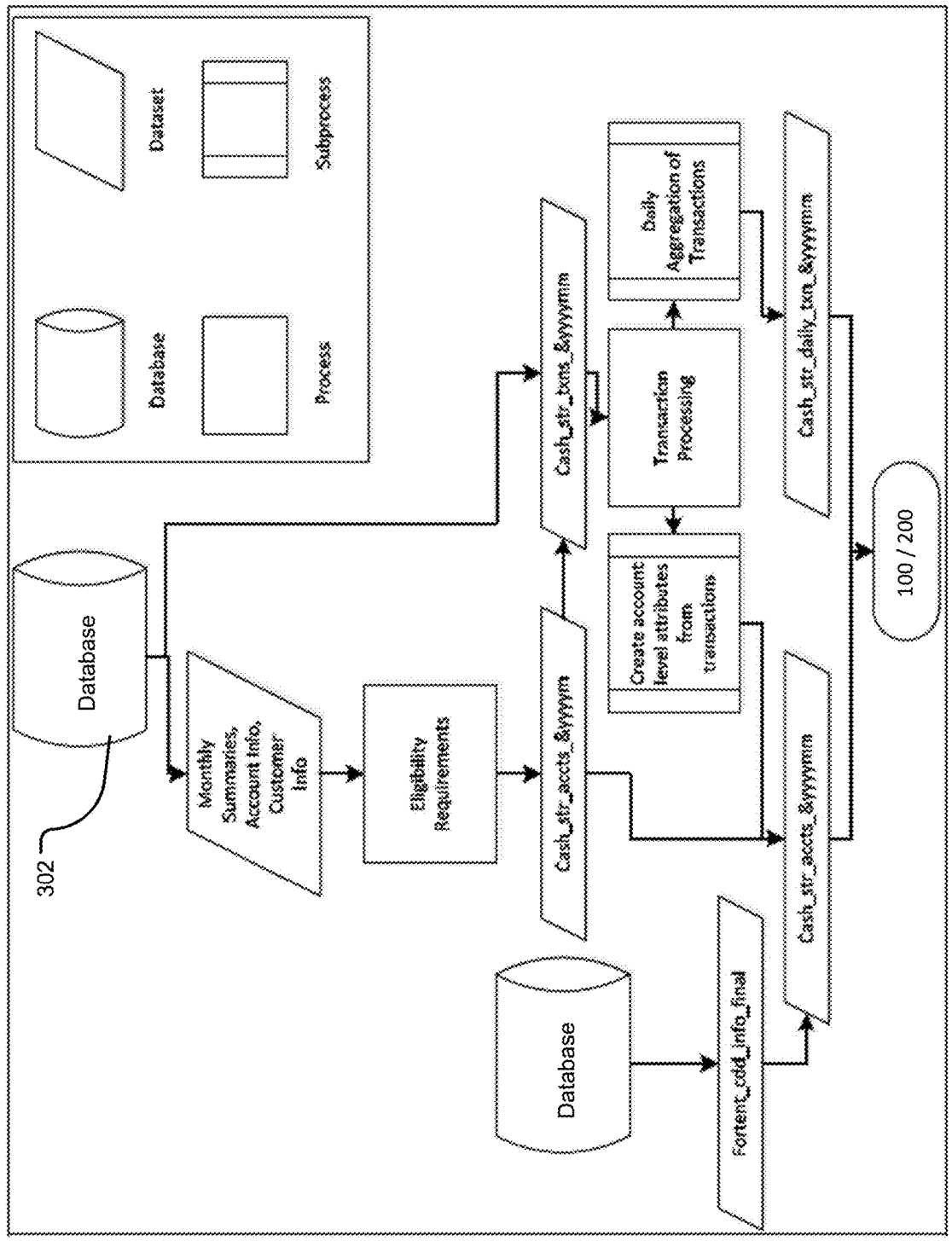
FIG. 6 illustrates a diagram of the cash structuring monitoring system and/or the cash structuring monitoring process according to aspects of the disclosure.

The disclosed implementations of the cash structuring monitoring system 100 and/or the cash structuring monitoring process 200 may be configured to implement a Convolutional Neural Network to solve a multi-label classification problem that relates to classifying activity that is likely to be considered suspicious by human investigators. The disclosed implementations of the cash structuring monitoring system 100 and/or the cash structuring monitoring process 200 may be configured such that Data may be pulled from a database 302, as illustrated in FIG. 6, and other internal systems maintained by IT. Moreover, the cash structuring monitoring system 100 and/or the cash structuring monitoring process 200 may be configured to determine if the data is accurate and current.

The disclosed implementations of the cash structuring monitoring system 100 and/or the cash structuring monitoring process 200 may be configured to identify potentially suspicious cash structuring activity that may be related to money laundering and other financial crimes. The disclosed implementations of the cash structuring monitoring system 100 and/or the cash structuring monitoring process 200 may be configured to detect AML issues and/or BSA [please provide definition of acronym*] issues that may arise after account opening by conducting reasonable transaction monitoring on all customers, particularly those presenting a transactional risk. In aspects, disclosed implementations of the cash structuring monitoring system 100 and/or the cash structuring monitoring process 200 may be configured to classify behavior that has already occurred, and not to make predictions or forecast future behavior.

The disclosed implementations of the cash structuring monitoring system 100 and/or the cash structuring monitoring process 200 may be configured to implement a convolutional neural network to evaluate a broader population than the current programs. These current programs utilize simple value/volume threshold rules, and present significant overlap between them in addition to high rates of false positives. Implementations of the disclosed implementations of the cash structuring monitoring system 100 and/or the cash structuring monitoring process 200 may be configured such that the monthly alerted account volume will on average drop with the reduction in false positives. In this regard, the disclosed implementations of the cash structuring monitoring system 100 and/or the cash structuring monitoring process 200 has been subject to numerous iterations of tests and has shown to reduce the population of alerts while increasing the number of Structuring SARs [please provide definition of acronym*] and the SAR yield.

In aspects, the disclosed implementations of the cash structuring monitoring system 100 and/or the cash structuring monitoring process 200 may operate during a month-end run process and generate outputs and ingests the outputs into the database 302 to generate alerts. Moreover, the disclosed implementations of the cash structuring monitoring system 100 and/or the cash structuring monitoring process 200 may be configured to perform ongoing monitoring to track the performance of the outputs. In particular, the disclosed implementations of the cash structuring monitoring system 100 and/or the cash structuring monitoring process 200 generates a dataset from the outputs each month and loads them into the database 302. In aspects, the cash structuring monitoring system 100 and/or the cash structuring monitoring process 200 may utilize a User Batch Alert process to create alerts during the month end run.

In aspects, the cash structuring monitoring system 100 and/or the cash structuring monitoring process 200 may send FCC the alerts, which may be coded for personal deposits, non-personal deposits, personal withdrawals, non-personal withdrawals, and/or the like for determination of whether SARs need to be filed.

In aspects, the cash structuring monitoring system 100 and/or the cash structuring monitoring process 200 may be configured to evaluate an eligible DDA/SAV account population each month. In aspects, the cash structuring monitoring system 100 and/or the cash structuring monitoring process 200 may be configured such that the most suspicious population is selected for alert creation and sent to investigators to determine if SARs need to be filed.

Figure 2:
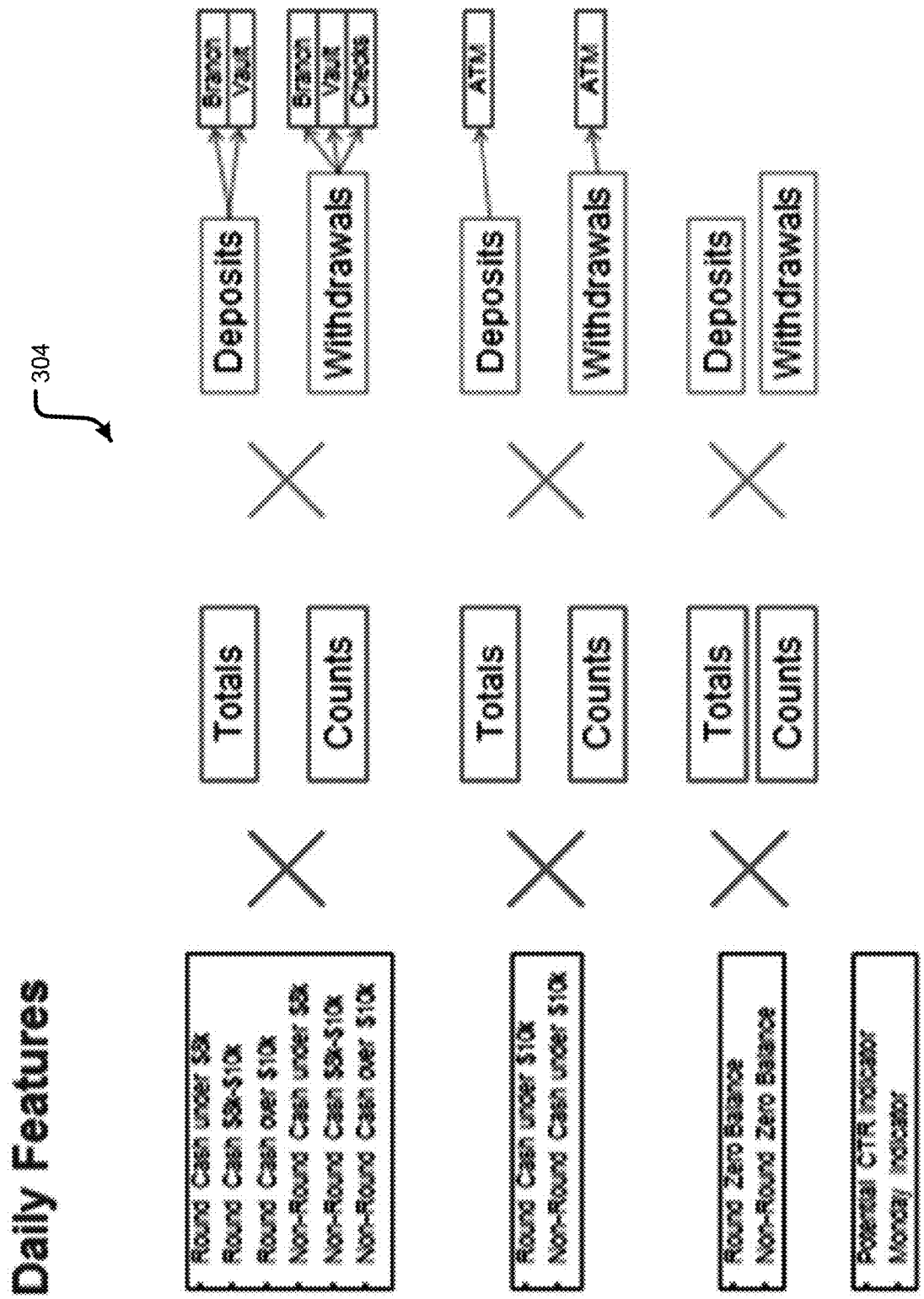
FIG. 2 illustrates exemplary inputs to the cash structuring monitoring system and/or the cash structuring monitoring process according to aspects of the disclosure.

FIG. 2 illustrates exemplary inputs to the cash structuring monitoring system and/or the cash structuring monitoring process according to aspects of the disclosure.

In particular, FIG. 2 illustrates exemplary inputs 304 to the cash structuring monitoring system 100 and/or the cash structuring monitoring process 200 according to aspects of the disclosure. The exemplary inputs 304 to the cash structuring monitoring system 100 and/or the cash structuring monitoring process 200 may include daily inputs and account-level global inputs. The daily inputs may be for each day in the monitored month and prior months from an account's transactions. These daily inputs may be derived from the raw transactions, and are grouped by whether the transaction is a deposit or withdrawal, round or non-round, and for cash transactions the value of the transaction, and the location where the transaction took place. For each of these groups, the total value and total count for the day may be calculated. In addition, for each day two indicator inputs are set. In aspects, the exemplary inputs 304 may include a "Monday Indicator" that signifies if the day is a Monday; and/or the exemplary inputs 304 may include a "Potential CTR Indicator" that may be calculated from the sum of the sub-$10 k cash transactions on each side. If that sum is greater than $10,000 then the indicator may be set to one, otherwise it is set to zero as illustrated in the table shown in FIG. 7.

The exemplary inputs 304 may be a combination of account-level attributes and inputs calculated from the transaction level and aggregated up to the account-level. In aspects, distinct location counts and Benford's law are aggregated across the monitored month's transactions and the prior month's transactions. The eligibility indicators are aggregated from just the monitored month's transactions.

After generation of the exemplary inputs 304, the inputs may be capped and then may be z-score normalized. The capping and the standardization provide two benefits: 1) it focuses the cash structuring monitoring system 100 and/or the cash structuring monitoring process 200 on the behavior of interest, which is under these caps; 2) it improves the estimation of the cash structuring monitoring system 100 and/or the cash structuring monitoring process 200 by lowering the variance of the weight updates.

In aspects, the cash structuring monitoring system 100 and/or the cash structuring monitoring process 200 may utilize two independent response variables: one for Cash Structuring Deposits and the other for Cash Structuring Withdrawals. Both are binary indicators used to classify if an observation is a Cash Structuring SAR on each side, and has a value of "1" if it is a responder. For example, if account ABC was determined to be a Cash Structuring Deposits SAR, then it would have a 1 for the Deposits response, and a zero for the Withdrawals response.

Note that the cash structuring monitoring system 100 and/or the cash structuring monitoring process 200 may be configured to attempt to find quality matches to suspicious activity subjectively determined by the investigators instead of attempting to find "true" suspicious activity based upon some external truth.

In aspects, the cash structuring monitoring system 100 and/or the cash structuring monitoring process 200 may utilize a deep learning approach wherein the algorithm seeks to learn low-level and high-level features that best represent the data. The efficacy of machine learning programs implemented by the cash structuring monitoring system 100 and/or the cash structuring monitoring process 200 may be heavily dependent upon the quality of the data representation used. When the representation is composed of hand-crafted features, as it typically is in traditional classification methods, its quality is directly affected by the skill and expertise of the analyst tasked with feature creation. By leveraging data-driven feature extraction, deep learning methods implemented by the cash structuring monitoring system 100 and/or the cash structuring monitoring process 200 significantly reduce the need for domain expertise for construction of the data representation and increase the program's accuracy.

In deep learning methods implemented by the cash structuring monitoring system 100 and/or the cash structuring monitoring process 200, the data representation may be learned by applying mathematical operations first to the low-level inputs, and then successively to the previously learned transformations. This layering implemented by the cash structuring monitoring system 100 and/or the cash structuring monitoring process 200 enables the algorithm to learn abstract concepts of the data that would otherwise be missed. Further, implementations of the cash structuring monitoring system 100 and/or the cash structuring monitoring process 200 may create a data representation that is useful as input to a supervised classifier.

Referring back to FIG. 1, FIG. 1 illustrates how the data flows through the cash structuring monitoring system 100 and/or the cash structuring monitoring process 200. More specifically, the cash structuring monitoring system 100 and/or the cash structuring monitoring process 200 may receive incoming data 110. The incoming data 110 may include the exemplary inputs 304 that may include global inputs and daily inputs. The exemplary inputs 304 may be forwarded to a daily pattern extraction and aggregation module 112. The output of the daily pattern extraction and aggregation module 112 may be provided to a classifier 114. Additionally, the classifier 114 may also receive the exemplary inputs 304. The output of the classifier 114 may include one or more scores 140.

Figure 3:
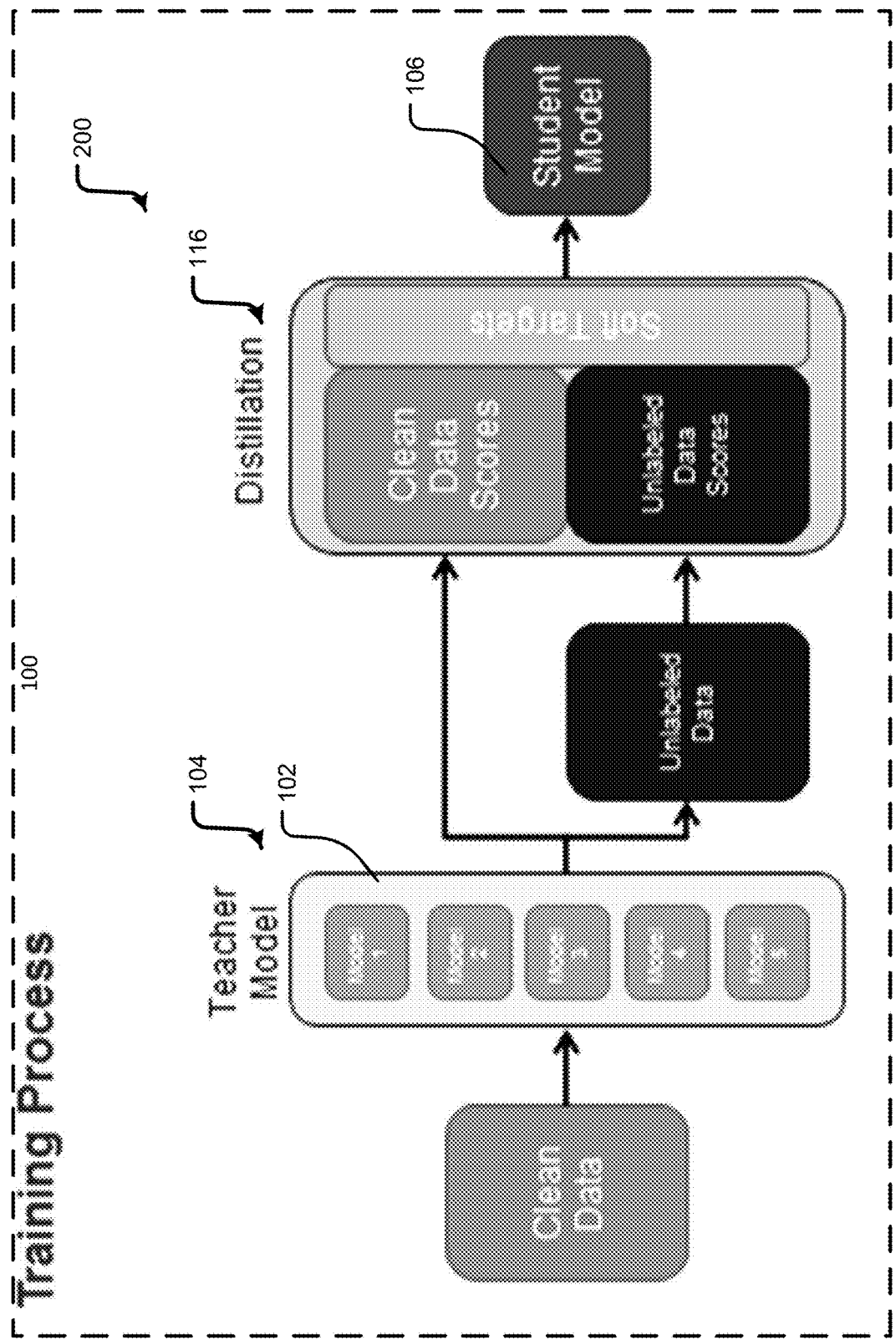
FIG. 3 illustrates a training process of the cash structuring monitoring system and/or the cash structuring monitoring process according to aspects of the disclosure.

FIG. 3 illustrates a training process of the cash structuring monitoring system and/or the cash structuring monitoring process according to aspects of the disclosure.

In particular, FIG. 3 illustrates a training process of the cash structuring monitoring system 100 and/or the cash structuring monitoring process 200 according to aspects of the disclosure. In aspects, the cash structuring monitoring system 100 and/or the cash structuring monitoring process 200 may utilize a supervised approach coupled with a semi-supervised approach as part of a distilled deep convolutional neural network. In aspects, the cash structuring monitoring system 100 and/or the cash structuring monitoring process 200 may utilize a first set of supervised convolutional neural networks 102 that may be trained on the clean development data. In one exemplary implementation of the cash structuring monitoring system 100 and/or the cash structuring monitoring process 200, there may be five implementations of the convolutional layers of the convolutional neural networks 102. The first a set of supervised convolutional neural networks 102 may make up the ensemble teacher model 104. Then each of the convolutional neural networks 102 may be scored on a random sample of unlabeled data from the eligible population. Finally, the scores on the clean data and the sampled unlabeled data may be averaged by the cash structuring monitoring system 100 and/or the cash structuring monitoring process 200 with equal weight from the convolutional neural networks 102 into a single soft target score that is used in training a distilled student model 106 of the ensemble.

In aspects, the convolutional neural networks 102 may be configured as Convolutional Neural Networks (CNN) that may be a specialized kind of neural network for processing data that has a known grid-like topology. In aspects, the convolutional neural networks 102 implemented by the cash structuring monitoring system 100 and/or the cash structuring monitoring process 200 may implement deep learning methods by implementations of the convolutional layers of the convolutional neural networks 102. In this regard, the algorithm learns a rich data representation by applying mathematical operations first to the low-level inputs, and then successively to the previously learned transformations. This layering enables the algorithm implemented by the convolutional layers of the convolutional neural networks 102 to learn abstract concepts of the data that would otherwise be missed. The convolutional layers of the convolutional layers of the convolutional neural networks 102 may drive the deep learning process in the disclosed implementation of the cash structuring monitoring system 100 and/or the cash structuring monitoring process 200. In this case, the cash structuring monitoring system 100 and/or the cash structuring monitoring process 200 may utilize the prior knowledge of a timing of transactions relative to each other and this may be key to the SAR decision process. The convolutional layers implemented by the disclosed implementation of the cash structuring monitoring system 100 and/or the cash structuring monitoring process 200 may provide a natural way to integrate this a priori information.

Figure 4:
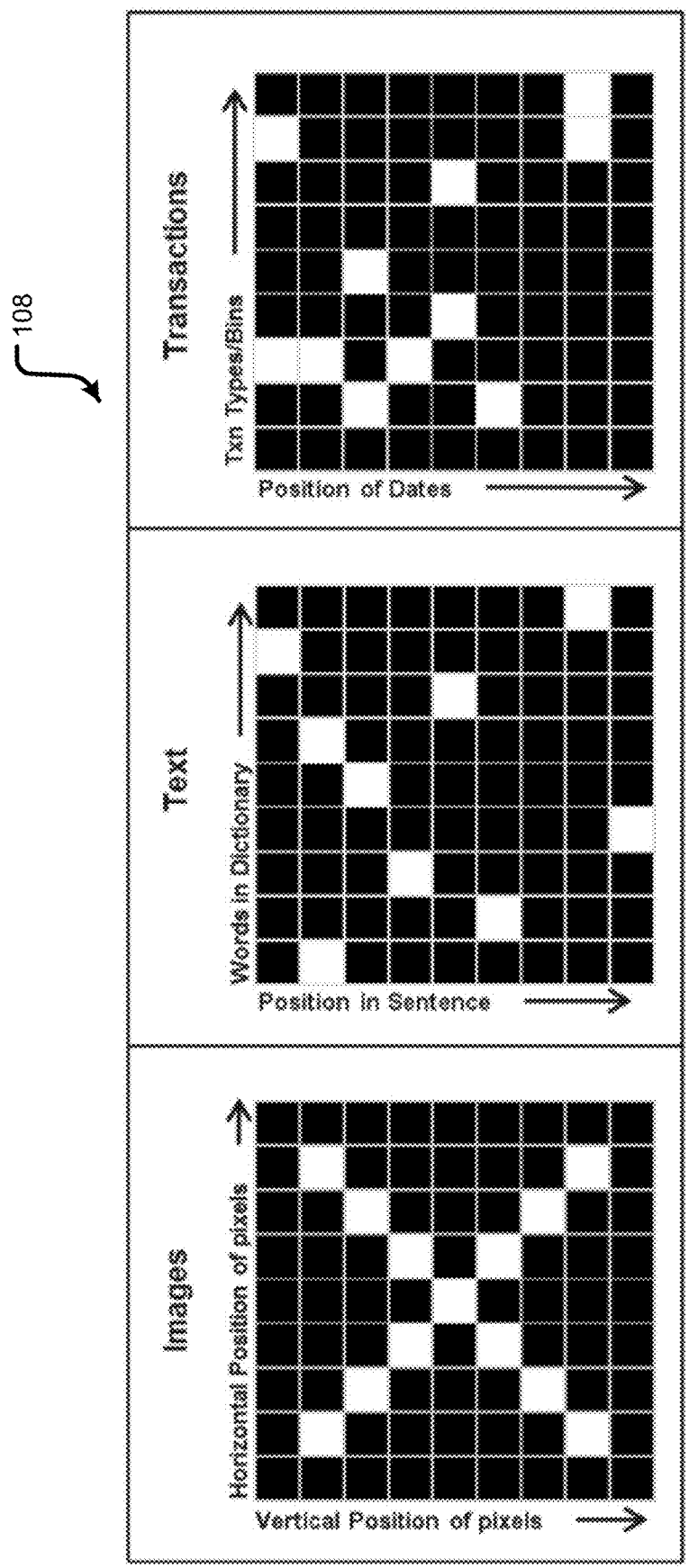
FIG. 4 provides a visual representation of how transaction records can be organized for use in the convolutional layers of the convolutional neural networks according to aspects of the disclosure.

FIG. 4 provides a visual representation of how transaction records can be organized for use in the convolutional layers of the convolutional neural networks according to aspects of the disclosure.

In particular, FIG. 4 provides a visual representation 108 of how transaction records can be organized for use in the convolutional layers of the convolutional neural networks 102 according to aspects of the disclosure. More specifically, the visual representation 108 illustrates how image classification can be seen as analogous to AML classification. More specifically, FIG. 4 illustrates examples of different data types structured as a grid for use the convolutional layers of the convolutional neural networks 102 implemented by the cash structuring monitoring system 100 and/or the cash structuring monitoring process 200.

In aspects, the disclosed implementations of the cash structuring monitoring system 100 and/or the cash structuring monitoring process 200 may utilize ensemble learning. The ensemble learning may involve training multiple models on the same task. Each individual model may be trained independently of the others, then the predictions for each model are combined, this is called model averaging.

In aspects, the disclosed implementations of the cash structuring monitoring system 100 and/or the cash structuring monitoring process 200 may utilize distillation 116. The distillation 116 may involve transferring knowledge from a large model, or ensemble, to a smaller model. The distillation 116 implements this by taking the scores for each observation from the large model and setting them as the soft target labels for training the smaller model. The distillation 116 may enable the small model to learn how to generalize to new data as well as the large model.

In aspects, the disclosed implementations of the cash structuring monitoring system 100 and/or the cash structuring monitoring process 200 may utilize training. The training of a neural network as implemented by the cash structuring monitoring system 100 and/or the cash structuring monitoring process 200 may involve solving a minimization problem with the loss function serving as the objective function. In this regard, a stochastic gradient descent (SGD) and its variants may be the primary estimation algorithms used in training the convolutional layers of the convolutional neural networks 102 of the cash structuring monitoring system 100 and/or the cash structuring monitoring process 200. But SGD can be slow to learn, is sensitive to its learning rate schedule, and has issues with ill-scaled problems. Accordingly, aspects of the disclosed implementation of the cash structuring monitoring system 100 and/or the cash structuring monitoring process 200 may utilize adaptive estimation methods to address these issues.

Figure 5:
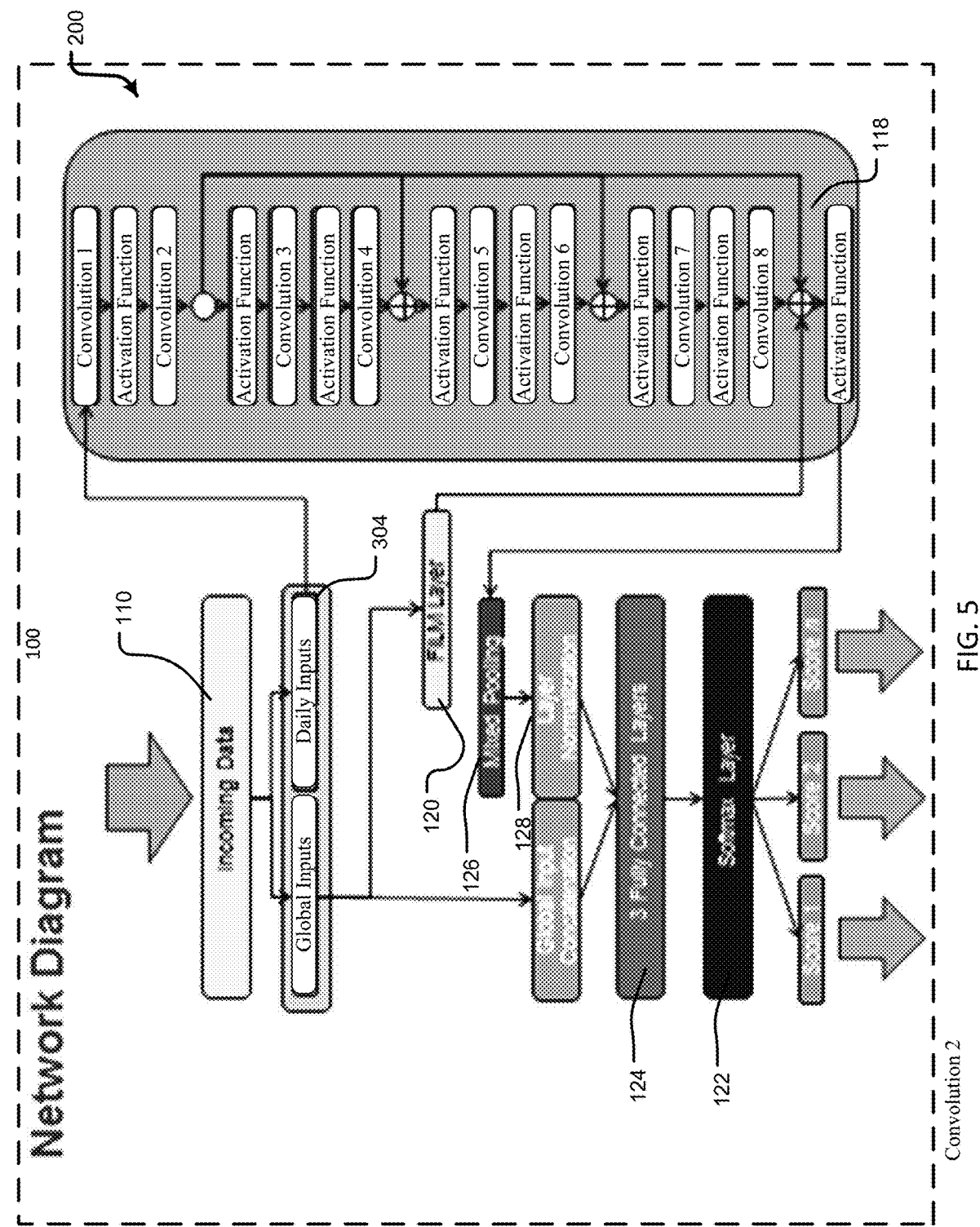
FIG. 5 illustrates a network diagram implemented by the cash structuring monitoring system and/or the cash structuring monitoring process according to aspects of the disclosure.

FIG. 5 illustrates a network diagram implemented by the cash structuring monitoring system and/or the cash structuring monitoring process according to aspects of the disclosure.

In particular, FIG. 5 illustrates a network diagram implemented by the cash structuring monitoring system 100 and/or the cash structuring monitoring process 200 according to aspects of the disclosure. In particular, the cash structuring monitoring system 100 and/or the cash structuring monitoring process 200 may be configured to take the incoming data 110 that comprises the exemplary inputs 304 and process the exemplary inputs 304 into global inputs and daily inputs.

Further, the cash structuring monitoring system 100 and/or the cash structuring monitoring process 200 may include convolutional network layers (CNN) 118. The daily inputs may be fed into the convolutional network layers (CNN) 118. For each layer in the convolutional network layers (CNN) 118, a convolution may be performed on the input and then is followed by the non-linear activation function. The output from the activation function may then be fed as input to the next layer of the convolutional network layers (CNN) 118. The convolutional network layers (CNN) 118 may utilize residual connections that may be used after certain convolutional layers. In aspects, the convolutional network layers (CNN) 118 may utilize residual connections that may be used after convolutional layers 4, 6, and 8. Before the final activation function in the convolutional network layers (CNN) 118, the convolutional outputs are modulated by a FiLM layer 120 constructed of the global inputs. The daily outputs from the convolutional network layers (CNN) 118 may be aggregated to the account-level by the mixed pooling layer. These are then layer normalized, and the global inputs are concatenated to them. This data may then be fed into a three layer fully connected network 124. Output scores are calculated by a softmax layer 122.

In aspects, the convolutional network layers (CNN) 118 may utilize residual networks. In this regard, the residual networks may use skip connections to allow information from the inputs, or earlier layers, to flow more easily into the deeper layers of the convolutional network layers (CNN)

118. Overall, these structures have been shown to increase training and test accuracy, as well as decrease the time needed to train a CNN.

In aspects, the disclosed implementations of the cash structuring monitoring system 100 and/or the cash structuring monitoring process 200 may employ dilated convolutions. In this regard, a dilated convolution may be a convolution where a filter is applied over an area larger than its length by skipping input values with a certain step. The dilated convolution can be thought of as convolutions with holes in them. The dilated convolution may allow the convolutional network layers (CNN) 118 to have very large receptive fields in a handful of layers without increasing the number of parameters needed or potentially losing information through a pooling operation. The dilations may first be consecutively increased, and then may be stepped back down to zero by the finish of an operation of the convolutional layers. This "pyramiding" may reduce potential distortion of smaller patterns by continuously increasing dilations.

In aspects, the disclosed implementations of the cash structuring monitoring system 100 and/or the cash structuring monitoring process 200 may utilize Exponential Linear Units (ELUs). The ELUs may implement activation functions that may be used in place of the more common ReLU activation function. The ELUs may decrease training time and increase accuracy on classification tasks for the convolutional network layers (CNN) 118.

In aspects, the disclosed implementations of the cash structuring monitoring system 100 and/or the cash structuring monitoring process 200 may utilize Feature-wise Linear Modulation (FiLM) layers. The FiLM layer 120 may be a per-channel scaling and shifting to the convolutional feature maps. The convolutional outputs may be scaled and shifted conditional upon the global inputs. Thus, increasing the descriptive power of the global inputs included in the FiLM layer 120 and the capacity of the model.

In aspects, the disclosed implementations of the cash structuring monitoring system 100 and/or the cash structuring monitoring process 200 may utilize pooling. The pooling may perform dimension reduction, and may provide spatial invariance for the patterns extracted by the convolutional features. For example, patterns within the pooling window may be treated similarly independent of where they appear in the window. In aspects, this may be time invariance, for example a pattern of four transactions close together at the end of the month is treated the same as if it occurred at the beginning of the month.

In aspects, the disclosed implementations of the cash structuring monitoring system 100 and/or the cash structuring monitoring process 200 may utilize Mixed pooling 126. The mixed pooling 126 may be used in place of either max pooling or average pooling. In mixed pooling 126 both average and max pooling are calculated and a learned coefficient is used to weight the split between them. Theoretically this provides some of the advantages of both approaches. For example, if the parameter is set to one, then this is equivalent to using max pooling. Conversely if the parameter is set to zero, then this is equivalent to using average pooling. Any value between zero and one denotes a mixing of average and max pooling. Mixed pooling 126 has been shown to "provide a boost in invariance properties relative to conventional pooling" and improve generalization accuracy.

In aspects, the disclosed implementations of the cash structuring monitoring system 100 and/or the cash structuring monitoring process 200 may utilize layer normalization 128. The layer normalization 128 may work by normalizing all of the inputs to a layer before the activation function for each observation. Layer normalization 128 may be implemented after the convolutional features are pooled. This normalization makes the estimation algorithm less likely to diverge, which enables the use of higher learning rates and thus leads to shorter training times.

In aspects, the disclosed implementations of the cash structuring monitoring system 100 and/or the cash structuring monitoring process 200 may train and utilize a single multi-label network. In aspects, the network may be trained as a joint binary neural network (JBNN).

In aspects, the disclosed implementations of the cash structuring monitoring system 100 and/or the cash structuring monitoring process 200 may utilize three types of regularization. These may include: L2 weight decay, Dropout, and Entropy confidence penalty. All three function independently of each other. Most of the regularization is handled by the weight decay and dropout. Regularization provided by the entropy confidence penalty is supplemental to the others. The impacts of each are controlled by their associated hyper-parameter. Regularization may be any modification made to a learning algorithm that is intended to reduce its generalization error, but not its training error. Effective use of regularization provides high capacity models robustness against overfitting, and stabilizes the learning algorithm In aspects, the disclosed implementations of the cash structuring monitoring system 100 and/or the cash structuring monitoring process 200 may utilize L2 Weight Decay. In aspects, the L2 weight decay may drive the weights of the cash structuring monitoring system 100 and/or the cash structuring monitoring process 200 closer to the origin. The hyper-parameter may control a "tradeoff between fitting and overfitting the data. The hyper-parameter may implement this by setting a budget of total weight that is then assigned to the features based upon how much they contribute to the objective of classification. This budget provides a constraint on the function against overfitting.

In aspects, the disclosed implementations of the cash structuring monitoring system 100 and/or the cash structuring monitoring process 200 may utilize dropout. In this regard, ensembles may be effective at preventing overfitting, but large ensembles of neural networks can be impractical to use due to time and computing constraints. It functions by randomly dropping hidden units and their connections from the cash structuring monitoring system 100 and/or the cash structuring monitoring process 200 during training. From this, overfitting can be significantly reduced, thus improving generalization performance.

In aspects, the disclosed implementations of the cash structuring monitoring system 100 and/or the cash structuring monitoring process 200 may utilize an Entropy Confidence Penalty. In particular, the cash structuring monitoring system 100 and/or the cash structuring monitoring process 200 may become over-confident in its outputs. For example, the cash structuring monitoring system 100 and/or the cash structuring monitoring process 200 is 100% certain that an observation in the training data is in a single class. This usually happens when the cash structuring monitoring system 100 and/or the cash structuring monitoring process 200 is overfitting. In this regard, confidence penalty provides more benefit on increasing generalization performance in the case of limited training data, and where the training data may not be representative of the underlying distribution.

In aspects, the disclosed implementations of the cash structuring monitoring system 100 and/or the cash structuring monitoring process 200 may implement a deep learning process that learns all of the account-level features representing daily patterns in an end-to-end fashion. On the other hand, all of the other algorithms are fully reliant upon handcrafted features.

In aspects, the disclosed implementations of the cash structuring monitoring system 100 and/or the cash structuring monitoring process 200 may implement a combination of Adam and Nesterov SGD algorithms used to estimate the network. The estimation process may work as follows: one observation at a time is run through the forward pass of the cash structuring monitoring system 100 and/or the cash structuring monitoring process 200 and its associated loss is calculated. Then the loss is back propagated through the cash structuring monitoring system 100 and/or the cash structuring monitoring process 200 to derive the gradients at each layer. These gradients are then saved, and the next observation is run through the cash structuring monitoring system 100 and/or the cash structuring monitoring process 200. After a batch of observations is completed, the gradients at each layer of the cash structuring monitoring system 100 and/or the cash structuring monitoring process 200 are averaged and then used to update the weight matrices. Following the update, the gradients are set to zero, and the next batch is started. The observations are randomly shuffled before being batched. An epoch is complete after one pass through the training dataset.

Before the estimation may begin, the weight matrices of the cash structuring monitoring system 100 and/or the cash structuring monitoring process 200 may have to be initialized with starting weight values. Each weight matrix may be first pre-initialized with random values pulled from a normal distribution. Then using the right-singular vectors from the singular value decomposition of the matrix, the weight matrix may be set to an orthonormal basis. This may allow for improvements in learning and generalization performance when initializing the weight matrices to an orthonormal basis. It has been empirically noticed that having a better initialization may result in improved the rate of convergence during training. After the initialization is complete, the weights in each matrix of the cash structuring monitoring system 100 and/or the cash structuring monitoring process 200 may be adjusted using a corrective factor given by for use with ELU activation functions and dropout. This adjustment has been empirically shown to improve learning. Despite being over-parameterized, neural networks implemented by the disclosed implementations of the cash structuring monitoring system 100 and/or the cash structuring monitoring process 200 exhibit strong generalization performance. In this regard, the overall accuracy of the cash structuring monitoring system 100 and/or the cash structuring monitoring process 200 on the training data has been found to be 99.95%.

Figure 8:
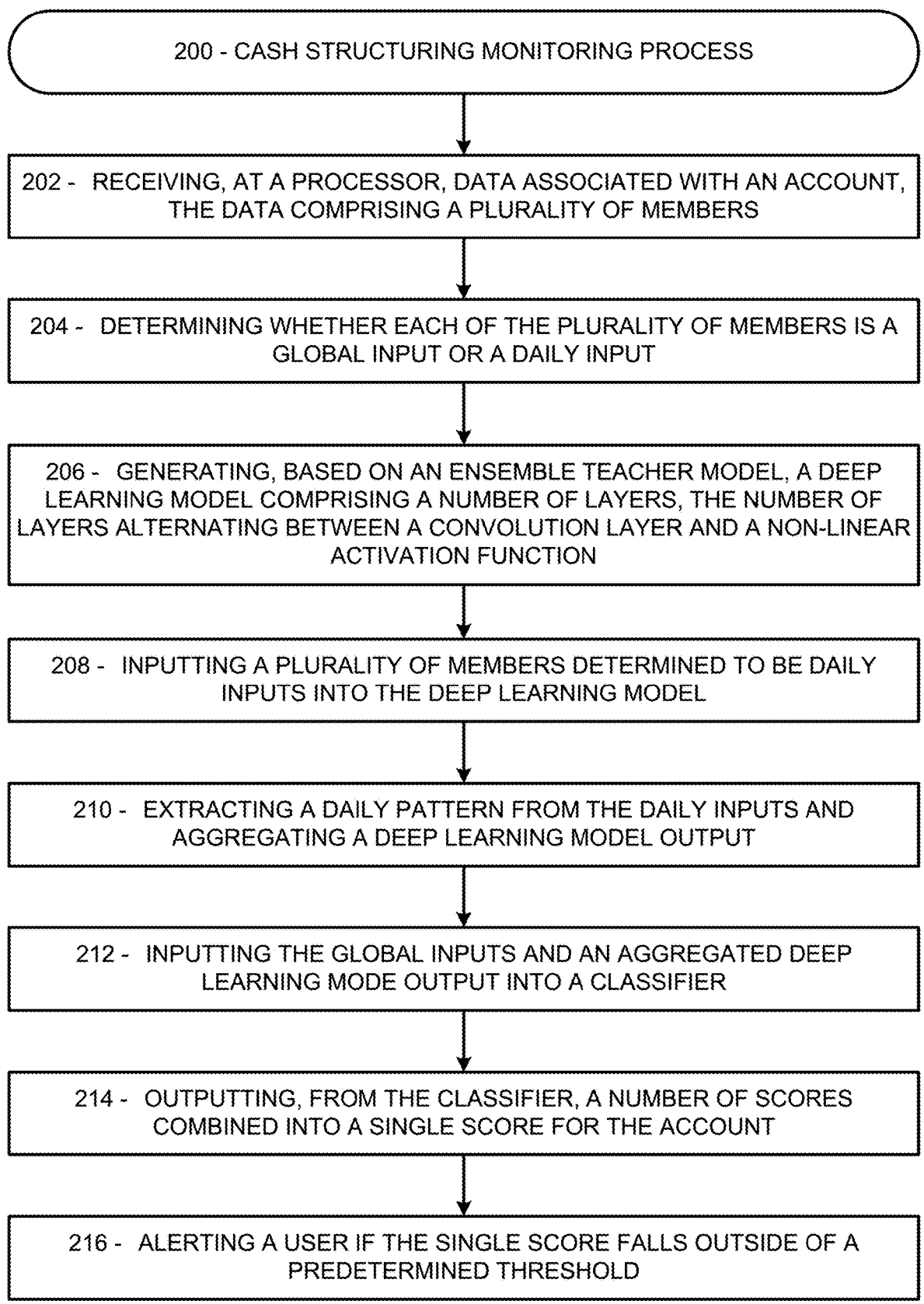
FIG. 8 is a flowchart illustrating an exemplary implementation of the cash structuring monitoring process according to aspects of the disclosure.

FIG. 8 is a flowchart illustrating an exemplary implementation of the cash structuring monitoring process according to aspects of the disclosure.

In particular, FIG. 9 is a flowchart illustrating an exemplary implementation of the cash structuring monitoring process 200 according to aspects of the disclosure. The implementation of the cash structuring monitoring process 200 may include one or more of the steps below.

In step 202, the method may include receiving, at a processor, data associated with an account, the data comprising a plurality of members. In step 204, the method may include determining whether each of the plurality of members is a global input or a daily input.

In step 206, the method may include generating, based on an ensemble teacher model, a deep learning model comprising a number of layers, the number of layers alternating between a convolution layer and a non-linear activation function. In step 208, the method may include inputting a plurality of members determined to be daily inputs into the deep learning model.

In step 210, the method may include extracting a daily pattern from the daily inputs and aggregating a deep learning model output. In step 212, the method may include inputting the global inputs and an aggregated deep learning mode output into a classifier.

In step 214, the method may include outputting, from the classifier, a number of scores combined into a single score for the account. In step 216, the method may include alerting a user if the single score falls outside of a predetermined threshold FIG. 9 depicts a computing device that may be used in various aspects in implementing the cash structuring monitoring system.

In particular, FIG. 9 depicts a computing device that may be used in various aspects in implementing the cash structuring monitoring system 100. The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may include processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may read information from the mass storage device 828 by detecting the physical states or characteristics of one or more particular locations within the physical storage units.

In addition to the mass storage device 828 described herein, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may include a version of the LINUX operating system. The operating system may include a version of the WINDOWS SERVER operating system from the MICROSOFT Corporation. According to additional aspects, the operating system may include a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described herein. The computing device 800 may have access to computer-readable storage media storing computer-executable instructions, which, when executed by the computing device 800, may perform the methods described in relation to the Figures.

A computing device, such as the computing device 800 depicted in FIG. 9, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 9, may include other components that are not explicitly shown in FIG. 9, or may utilize an architecture completely different than that shown in FIG. 9.

As described herein, a computing device may be a physical computing device, such as the computing device 800 of FIG. 9. A computing node may also include a virtual machine host process and one or more virtual machine instances. Computer-executable instructions may be executed by the physical hardware of a computing device indirectly through interpretation and/or execution of instructions stored and executed in the context of a virtual machine.

Accordingly, the disclosure as set forth systems and methods to more effectively and efficiently identify potentially suspicious cash structuring activity that may be related to money laundering or other financial crimes.

The following are a number of nonlimiting EXAMPLES of aspects of the disclosure.

One EXAMPLE includes: a computer readable medium includes instructions for receiving data associated with an account, the data having a plurality of members. The computer readable medium in addition includes instructions for determining whether each of the plurality of members is a global input or a daily input. The computer readable medium moreover includes instructions for generating, based on an ensemble teacher model, a deep learning model having a number of layers, the number of layers alternating between a convolution layer and a non-linear activation function. The computer readable medium also includes instructions for inputting a plurality of members determined to be daily inputs into the deep learning model. The computer readable medium further includes instructions for extracting a daily pattern from the daily inputs and aggregating a deep learning model output; inputting the global inputs and an aggregated deep learning model output into a classifier; outputting, from the classifier, a number of scores combined into a single score for the account. The computer readable medium in addition includes instructions for alerting a user if the single score falls outside of a predetermined threshold.

The above-noted EXAMPLE may further include any one or a combination of more than one of the following EXAMPLES: The computer readable medium of the above-noted EXAMPLE where aggregating the deep learning model output may include: mixed pooling the deep learning model output; and normalizing a mixed pooled output. The computer readable medium of the above-noted EXAMPLE may include: modulating the plurality of members determined to be global inputs with a feature-wise linear modulation (FiLM) layer; and concatenating a set of modulated global inputs to the mixed pooled output that has been normalized. The computer readable medium of the above-noted EXAMPLE where generating a deep learning model may include: receiving a set of clean data; inputting the set of clean data into the ensemble teacher model, where an output of the ensemble teacher model is an unlabeled dataset and a set of clean data scores; distilling the unlabeled dataset and set of clean data scores into a set of target labels; averaging the set of target labels into a number of soft target scores; and creating a deep learning model using the number of soft target scores as a number of weights. The computer readable medium of the above-noted EXAMPLE where the ensemble teacher model may include a set of supervised convolutional neural networks. The computer readable medium of the above-noted EXAMPLE where a set of daily inputs are created from a set of transactions for each day over a period of prior months. The computer readable medium of the above-noted EXAMPLE where each daily input may include a binary Monday indicator and a binary potential currency transaction report (CTR) indicator. The computer readable medium of the above-noted EXAMPLE where the classifier may include a multilayer fully connected network with a softmax layer. The computer readable medium of the above-noted EXAMPLE may include a residual connection between the convolutional layer and activation functions.

One EXAMPLE includes: a method includes receiving, in at least one processor, data associated with an account, the data having a plurality of members. The method in addition includes determining with the at least one processor whether each of the plurality of members is a global input or a daily input. The method moreover includes generating with the at least one processor, based on an ensemble teacher model, a deep learning model having a number of layers, the number of layers alternating between a convolution layer and a non-linear activation function. The method also includes inputting with the at least one processor a plurality of members determined to be daily inputs into the deep learning model. The method further includes extracting with the at least one processor a daily pattern from the daily inputs and aggregating a deep learning model output; inputting with the at least one processor the global inputs and an aggregated deep learning model output into a classifier; outputting with the at least one processor, from the classifier, a number of scores combined into a single score for the account. The method in addition includes alerting with the at least one processor a user if the single score falls outside of a predetermined threshold.

The above-noted EXAMPLE may further include any one or a combination of more than one of the following EXAMPLES: The method of the above-noted EXAMPLE where aggregating the deep learning model output may include: mixed pooling the deep learning model output; and normalizing a mixed pooled output. The method of the above-noted EXAMPLE may include: modulating the plurality of members determined to be global inputs with a feature-wise linear modulation (FiLM) layer; and concatenating a set of modulated global inputs to the mixed pooled output that has been normalized. The method of the above-noted EXAMPLE where generating a deep learning model may include: receiving, at a processor, a set of clean data; inputting the set of clean data into the ensemble teacher model, where an output of the ensemble teacher model is an unlabeled dataset and a set of clean data scores; distilling the unlabeled dataset and set of clean data scores into a set of target labels; averaging the set of target labels into a number of soft target scores; and creating a deep learning model using the number of soft target scores as a number of weights. The method of the above-noted EXAMPLE where the ensemble teacher model may include a set of supervised convolutional neural networks. The method of the above-noted EXAMPLE where a set of daily inputs are created from a set of transactions for each day over a period of prior months. The method of the above-noted EXAMPLE where each daily input may include a binary Monday indicator and a binary potential currency transaction report (CTR) indicator. The method of the above-noted EXAMPLE where the classifier may include a multilayer fully connected network with a softmax layer. The method of the above-noted EXAMPLE may include a residual connection between the convolutional layer and activation functions.

One EXAMPLE includes: a system includes at least one processor configured to receive data associated with an account, the data having a plurality of members. The system in addition includes the at least one processor configured to determine whether each of the plurality of members is a global input or a daily input. The system moreover includes at least one processor configured to generate based on an ensemble teacher model, a deep learning model having a number of layers, the number of layers alternating between a convolution layer and a non-linear activation function. The system also includes at least one processor configured to input a plurality of members determined to be daily inputs into the deep learning model. The system further includes at least one processor configured to extract a daily pattern from the daily inputs and aggregating a deep learning model output; at least one processor configured to input the global inputs and an aggregated deep learning model output into a classifier; at least one processor configured to output a number of scores combined into a single score for the account. The system in addition includes at least one processor configured to alert a user if the single score falls outside of a predetermined threshold.

The above-noted EXAMPLE may further include any one or a combination of more than one of the following EXAMPLES: The system of the above-noted EXAMPLE where the deep learning model output may include: mixed pooling the deep learning model output; and normalizing a mixed pooled output. The system of the above-noted EXAMPLE may include: at least one processor configured to modulate the plurality of members determined to be global inputs with a feature-wise linear modulation (FiLM)

layer; and at least one processor configured to concatenate a set of modulated global inputs to the mixed pooled output that has been normalized. The system of the above-noted EXAMPLE where generating a deep learning model may include: at least one processor configured to receive a set of clean data; at least one processor configured to input the set of clean data into the ensemble teacher model, where an output of the ensemble teacher model is an unlabeled dataset and a set of clean data scores; at least one processor configured to distill the unlabeled dataset and set of clean data scores into a set of target labels; at least one processor configured to average the set of target labels into a number of soft target scores; and at least one processor configured to create a deep learning model using the number of soft target scores as a number of weights. The system of the above-noted EXAMPLE where the ensemble teacher model may include a set of supervised convolutional neural networks. The system of the above-noted EXAMPLE where a set of daily inputs are created from a set of transactions for each day over a period of prior months. The system of the above-noted EXAMPLE where each daily input may include a binary Monday indicator and a binary potential currency transaction report (CTR) indicator. The system of the above-noted EXAMPLE where the classifier may include a multilayer fully connected network with a softmax layer. The system of the above-noted EXAMPLE may include a residual connection between the convolutional layer and activation functions.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes-, from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A non-transitory computer readable medium storing instructions and when the instructions are executed on at least one processor, the instructions are configured for identifying potentially suspicious cash structuring activity, the instructions comprising:

receiving data associated with an account, the data comprising a plurality of members;

determining whether each of the plurality of members is a global input or a daily input;

generating, based on an ensemble teacher model, a deep learning model comprising a number of layers, the number of layers alternating between a convolution layer and a non-linear activation function;

inputting a plurality of members determined to be daily inputs into the deep learning model;

extracting a daily pattern from the daily inputs and aggregating a deep learning model output;

inputting the global inputs and an aggregated deep learning model output into a classifier;

outputting, from the classifier, a number of scores combined into a single score for the account; and alerting a user if the single score falls outside of a predetermined threshold.

2. The computer readable medium of claim 1, wherein aggregating the deep learning model output comprises:

mixed pooling the deep learning model output; and normalizing a mixed pooled output.

3. The computer readable medium of claim 2, further comprising:

modulating the plurality of members determined to be global inputs with a feature-wise linear modulation (FiLM) layer; and concatenating a set of modulated global inputs to the mixed pooled output that has been normalized.

4. The computer readable medium of claim 1, wherein generating a deep learning model comprises:

receiving a set of clean data;

inputting the set of clean data into the ensemble teacher model, where an output of the ensemble teacher model is an unlabeled dataset and a set of clean data scores;

distilling the unlabeled dataset and set of clean data scores into a set of target labels;

averaging the set of target labels into a number of soft target scores; and creating a deep learning model using the number of soft target scores as a number of weights.

5. The computer readable medium of claim 4, wherein the ensemble teacher model comprises a set of supervised convolutional neural networks.

6. The computer readable medium of claim 1, wherein a set of daily inputs are created from a set of transactions for each day over a period of prior months.

7. The computer readable medium of claim 6, wherein each daily input comprises a binary Monday indicator and a binary potential currency transaction report (CTR) indicator.

8. The computer readable medium of claim 1, wherein the classifier comprises a multilayer fully connected network with a softmax layer.

9. The computer readable medium of claim 1, further comprising a residual connection between the convolutional layer and activation functions.

10. A method for identifying potentially suspicious cash structuring activity, the method comprising:

receiving, in at least one processor, data associated with an account, the data comprising a plurality of members;

determining with the at least one processor whether each of the plurality of members is a global input or a daily input;

generating with the at least one processor, based on an ensemble teacher model, a deep learning model comprising a number of layers, the number of layers alternating between a convolution layer and a non-linear activation function;

inputting with the at least one processor a plurality of members determined to be daily inputs into the deep learning model;

extracting with the at least one processor a daily pattern from the daily inputs and aggregating a deep learning model output;

inputting with the at least one processor the global inputs and an aggregated deep learning model output into a classifier;

outputting with the at least one processor, from the classifier, a number of scores combined into a single score for the account; and alerting with the at least one processor a user if the single score falls outside of a predetermined threshold.

11. The method of claim 10, wherein aggregating the deep learning model output comprises:

mixed pooling the deep learning model output; and normalizing a mixed pooled output.

12. The method of claim 11, further comprising:

modulating the plurality of members determined to be global inputs with a feature-wise linear modulation (FiLM) layer; and concatenating a set of modulated global inputs to the mixed pooled output that has been normalized.

13. The method of claim 10, wherein generating a deep learning model comprises:

receiving, at a processor, a set of clean data;

inputting the set of clean data into the ensemble teacher model, where an output of the ensemble teacher model is an unlabeled dataset and a set of clean data scores;

distilling the unlabeled dataset and set of clean data scores into a set of target labels;

averaging the set of target labels into a number of soft target scores; and creating a deep learning model using the number of soft target scores as a number of weights.

14. The method of claim 13, wherein the ensemble teacher model comprises a set of supervised convolutional neural networks.

15. The method of claim 10, wherein a set of daily inputs are created from a set of transactions for each day over a period of prior months.

16. The method of claim 15, wherein each daily input comprises a binary Monday indicator and a binary potential currency transaction report (CTR) indicator.

17. The method of claim 10, wherein the classifier comprises a multilayer fully connected network with a softmax layer.

18. The method of claim 10, further comprising a residual connection between the convolutional layer and activation functions.

19. A system configured to identify potentially suspicious cash structuring activity, the system comprising:

at least one processor configured to receive data associated with an account, the data comprising a plurality of members;

the at least one processor configured to determine whether each of the plurality of members is a global input or a daily input;

at least one processor configured to generate based on an ensemble teacher model, a deep learning model comprising a number of layers, the number of layers alternating between a convolution layer and a non-linear activation function;

at least one processor configured to input a plurality of members determined to be daily inputs into the deep learning model;

at least one processor configured to extract a daily pattern from the daily inputs and aggregating a deep learning model output;

at least one processor configured to input the global inputs and an aggregated deep learning model output into a classifier;

at least one processor configured to output a number of scores combined into a single score for the account; and at least one processor configured to alert a user if the single score falls outside of a predetermined threshold.

20. The system of claim 19, wherein the deep learning model output comprises:

mixed pooling the deep learning model output; and normalizing a mixed pooled output.

21. The system of claim 20, further comprising:

at least one processor configured to modulate the plurality of members determined to be global inputs with a feature-wise linear modulation (FiLM) layer; and at least one processor configured to concatenate a set of modulated global inputs to the mixed pooled output that has been normalized.

22. The system of claim 19, wherein generating a deep learning model comprises:

at least one processor configured to receive a set of clean data;

at least one processor configured to input the set of clean data into the ensemble teacher model, where an output of the ensemble teacher model is an unlabeled dataset and a set of clean data scores;

at least one processor configured to distill the unlabeled dataset and set of clean data scores into a set of target labels;

at least one processor configured to average the set of target labels into a number of soft target scores; and at least one processor configured to create a deep learning model using the number of soft target scores as a number of weights.

23. The system of claim 22, wherein the ensemble teacher model comprises a set of supervised convolutional neural networks.

24. The system of claim 19, wherein a set of daily inputs are created from a set of transactions for each day over a period of prior months.

25. The system of claim 24, wherein each daily input comprises a binary Monday indicator and a binary potential currency transaction report (CTR) indicator.

26. The system of claim 19, wherein the classifier comprises a multilayer fully connected network with a softmax layer.

27. The system of claim 19, further comprising a residual connection between the convolutional layer and activation functions.

* * * * *